Jan. 28, 1958     L. LEE II     2,821,323

PIN PLUG

Filed Dec. 7, 1955

INVENTOR.
LEIGHTON LEE, II
BY
Lindsey and Prutzman
ATTORNEYS

United States Patent Office 2,821,323
Patented Jan. 28, 1958

2,821,323
PIN PLUG

Leighton Lee II, Guilford, Conn., assignor to The Lee Company, Westbrook, Conn., a corporation of Connecticut Application December 7, 1955, Serial No. 551,569

1 Claim. (Cl. 220—24.5)

This invention relates to a new and improved means for sealing an access hole in metallic castings and the like.

In the metal working field it is sometimes necessary to drill access holes or passages in a casting, in order to permit internal machining, or to provide means for cross connecting internal fluid carrying passages. It is usually necessary to close off these openings in order to preclude the introduction of foreign matter internally of the part or to preclude fluid leakage. One of the common methods of closing off such access passages has been the forcing of a short length of metal rod into the end of the passage. This method, while satisfactory in some cases, is quite unsatisfactory under circumstances where fluid under pressure is subsequently introduced into the passage, inasmuch as the rod may be forced out of the passage by the pressurized fluid. In order to attempt to prevent such an occurrence, it is necessary for the rod to have a diameter larger than the passage to an extent that there will be a relatively large compressive engagement between the rod and the casting or forging. In order to insert a rod of such a diameter into the hole without cracking the workpiece it is sometimes necessary to heat the area of the casting about the hole and cool the rod, prior to insertion of the rod. This of course makes for a relatively expensive operation.

Another method has been to tap the access opening and then thread a bolt or threaded plug therein. This method is relatively time-consuming and therefore expensive from a production standpoint, and also it is possible that fluid pressure behind the bolt or plug may result in leakage past the threads and externally of the casting or forging. There have been developed, of course, various complex methods for sealing openings such as found in boiler tubes and pipe ends. However, these methods are, for many apparent reasons, not suitable for use in closing off an access hole in a casting and the like.

It is therefore an object of this invention to provide a plug of novel construction for sealing an opening such as an access hole in a casting, forging and the like, which will be economical to manufacture and simple to use, yet which will afford satisfactory protection against blowout by fluid pressure, and which will effectively seal the opening against leakage of pressurized fluid.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claim.

Figure 1:
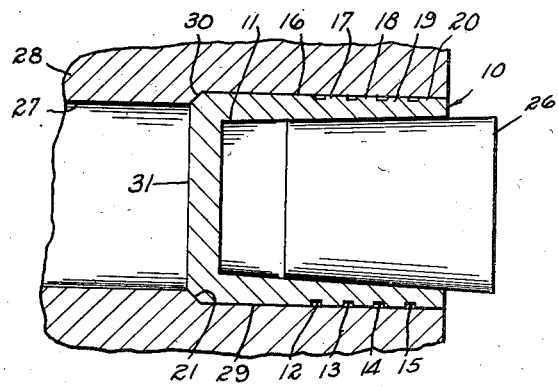
Fig. 1 is a fragmentary cross section of a casting or forging in which is received a plug constructed in accordance with this invention.

With reference to the drawings, a plug constructed in accordance with the invention is comprised of a cylindrical plug member 10 having a tapered bore 11 partially extending therethrough. A series of annular grooves 12, 13, 14 and 15 are disposed about the periphery of the plug member 10, to form the lands 16, 17, 18, 19 and 20.

A cylindrical pin member 26 provided with a taper substantially the same as the bore 11 of the plug member 10 is receivable in the bore 11. The pin 26 has a preselected end diameter such that when the pin is driven into the plug so that its top or right end, as viewed in the drawings, is flush with the top or right end of the plug as viewed in the drawings, a predetermined expansion of the outer diameter of the plug will have been brought about.

In the use of this device the hole or opening 27 in the part 28 is first enlarged to a diameter which is slightly larger than the outer diameter of the plug member 10. One of the particular advantages of this invention is that the diameter of the opening 27 relative to the outer diameter of the plug is not extremely critical, and in fact in practice it has been found that the diameter of the opening may be as much as .0012" greater than the outer diameter of the plug with no adverse effects. If a conventional counterboring tool such as a drill or reamer is used to enlarge the hole or opening 27, a chamfer as at 30 will be provided at the base of the counterbore. The chamfer 30 if preferably spaced axially of the hole 27, such that the plug member 10 may be seated thereon with the top of the plug flush with the surface of the work piece. In order to provide optimum sealing by the plug, the bottom of the plug is preferably provided with a chamfer as at 21 mating with the chamfer produced by the counterboring tool.

As can be readily seen in assembly of the device, the plug is first inserted in the opening. The pin 26 is then inserted in the bore 11 and driven flush with the top of the plug. When an axial force is first applied on the pin 26, the inclined surfaces of the work piece and plug formed by the chamfers 21 and 30 will be firmly engaged to prevent any further movement of the plug inwardly of the opening, and further to assist in preventing any leakage of fluid in the passage 27 past the plug.

Figure 2:
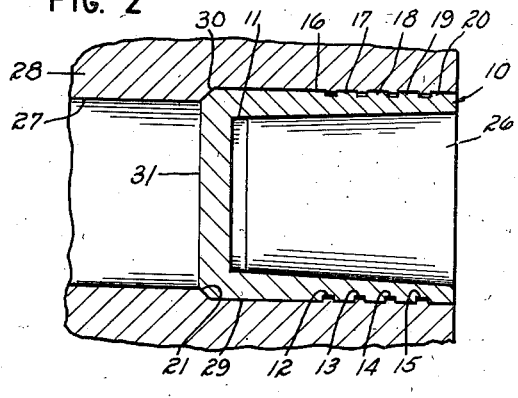
Fig. 2 is a cross sectional view, as in Fig. 1, after the plug has been expanded.
Figure 3:
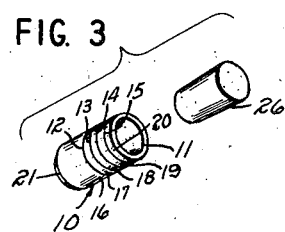
Fig. 3 is a perspective view of the elements of the plug in disassembly.

From Fig. 2 it can be observed that when the plug is further expanded, the lands 16 through 20 on the outer surface of the plug will form recesses or undercuts in the wall of the counterbore 29 to provide a seal at each land. This undercutting of the casting or forging effectively assures that there will be no blowout of the pin plug nor any leakage around the plug due to fluid pressure in the hole or opening 27. It is, of course, necessary to expand the plug sufficiently to obtain the sealing above mentioned without fracturing the part in which it is received. This is assured by the ability to control the amount of expansion of the outer diameter of the plug by providing a pin with an outer end diameter greater than the outer end diameter of the bore 11 by an amount corresponding to the desired expansion of the plug. In this manner, the expandable plug may be fabricated to have the desired amount of expansion when the pin is driven flush with the end of the plug, thus obviating the necessity for any calculations on the part of the machinist and assuring that the optimum in sealing is achieved without fracture of the casting. The angle of the taper of the bore 11 and the pin 26 must of course result in the desired expansion of the plug when the top of the pin is driven flush with the top of the plug. It is further desirable that the force necessary to accomplish this expansion be obtainable through the use of relatively light hand tools. To accomplish both of these results it has been found, for example, that a taper having an included angle of approximately 2.40 degrees provides with a minimum of effort the desired expansion of a plug having a diameter of approximately .400" with a pin travel during expansion of approximately .125".

It should be noted that it is another particular advantage of the invention that if there is any pressurized fluid within the hole or opening 27, such fluid would not come in contact with the pin 26 so as to possibly force the pin out of the plug, as the only contact of the expandable plug with any fluid in the hole or opening 27 is by the bottom surface 31 of the plug member 10.

Thus, it can be seen that there is provided an expandable plug of novel construction whereby the expansion of the plug within the opening is effectively controlled, whereby the opening is effectively sealed against leakage, and the plug effectively prevented from being forced out of the opening by any fluid pressure contained therein.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim:

In combination with a solid metal base member having an outwardly opening passageway provided with a cylindrical counterbore, a metal plug in said counterbore having its outer end adjacent the outer surface of the base member and having its inner end seated on the inner end of the counterbore, said plug having an outer cylindrical surface provided with a plurality of separate spaced apart non-intersecting annular grooves and initially dimensioned to provide a slip fit with the counterbore, said plug having a frusto-conical socket with its largest diameter at the outer end of the plug, said socket terminating short of the inner end of the plug and extending axially throughout the portion of the plug bearing the annular grooves, and a frusto-conical metal pin in said socket driven flush with the outer end of the plug, said plug being of larger dimensions diametrically than the initial inside diametrical dimensions of the socket by a predetermined amount uniformly throughout whereby the plug is uniformly expanded radially a controlled amount by the pin causing the plug to deform and grip the inner surface of the counterbore with the grooves thereof in interlocking engagement with said inner surface.

References Cited in the file of this patent
UNITED STATES PATENTS

| | | |
|---|---|---|
| 577,737 | Flaherty | Feb. 23, 1897 |
| 1,120,369 | Booraem et al. | Dec. 8, 1914 |
| 1,914,409 | Draper | June 20, 1933 |
| 2,292,467 | Norsell | Aug. 11, 1942 |
| 2,543,430 | Anderson | Feb. 27, 1951 |
| 2,653,547 | Langdon | Sept. 29, 1953 |